Dec. 26, 1961 H. G. McCARTY 3,014,324
HAY CRUSHER
Filed Aug. 5, 1957 3 Sheets-Sheet 2

INVENTOR
HORACE G McCARTY
Joseph Allen Brown
ATTORNEY

Dec. 26, 1961 H. G. McCARTY 3,014,324
HAY CRUSHER
Filed Aug. 5, 1957 3 Sheets-Sheet 3
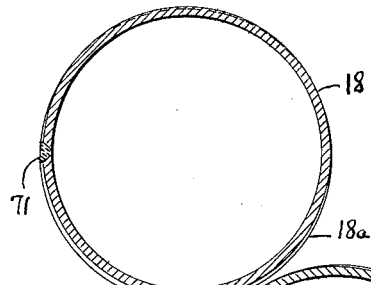
Fig. 3.
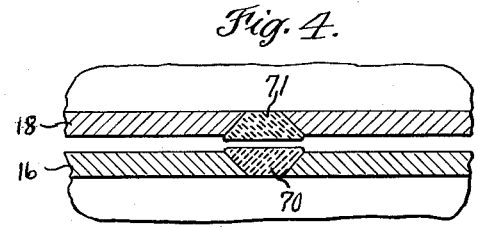
Fig. 4.
Fig. 5.
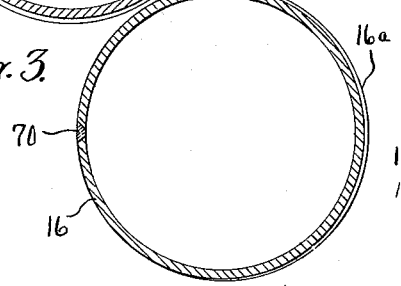
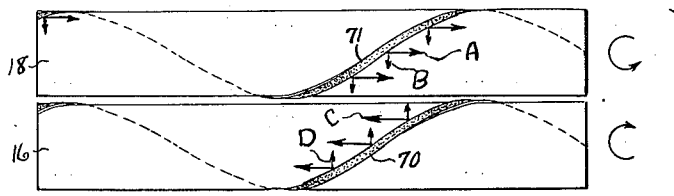
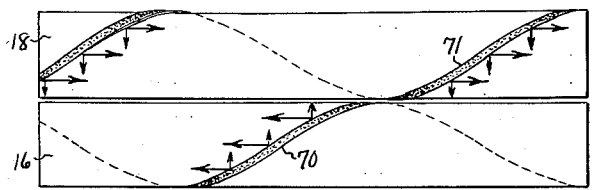
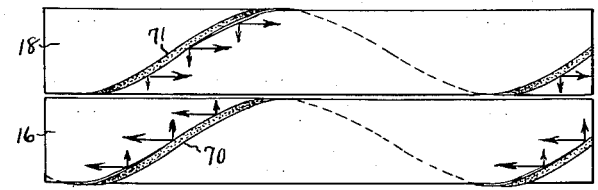
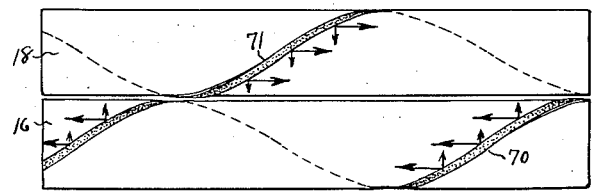
Fig. 6.
INVENTOR
HORACE G. McCARTY
Joseph Allen Brown
ATTORNEY

United States Patent Office 3,014,324
Patented Dec. 26, 1961

3,014,324
HAY CRUSHER
Horace G. McCarty, New Holland, Pa., assignor to Sperry Rand Corporation, New Holland, Pa., a corporation of Delaware
Filed Aug. 5, 1957, Ser. No. 676,217
3 Claims. (Cl. 56—1)

This invention relates to agricultural machines used for crushing the stems of cut crop material to accelerate drying.

Conventionally, hay is harvested by mowing the standing crop and then leaving it in swaths on the field to dry and cure. Later, the hay is formed into windrows by a side delivery rake or the like. The raking of the hay turns it over exposing hay formerly at the bottom of the swath to the sun and wind. Since the hay is deposited in a windrow it may be conveniently picked up for transport to a place of storage after the moisture content of the hay has been dropped a desired amount. On moderns farms the hay, upon being picked up, is either compressed into high density bales and then stored in a mow, or chopped and delivered to a silo or like storage receptacle.

Heretofore, machines have been provided which crimp the hay to release moisture. Hay crimpers snap each stem at spaced points along its length. Such crimping does only part of the job, the stem portions between two crimped points not being acted upon or opened to release the moisture therein. Other machines have been provided which crush each stem from end to end between two cylindrical rolls. This does a much superior job, forcing a materially greater portion of the moisture from the hay with the end result that the hay is ready sooner to be picked up and stored. The hours of drying time saved by crushing instead of crimping the hay may mean the difference between getting the hay into storage while dry or having it rained on which would cause a considerable loss. Also, this few hours difference if it comes at the end of a day may mean getting a crop into storage before dark or having to wait until morning thereby extending greatly the chance of rain damage.

In connection with hay crushing machines, as distinguished from hay crimpers, it has been found that large diameter rolls do a much better job than small ones. For example, rolls one foot in diameter perform better than six inch rolls. Also, in hay crushers, the lower roll is usually mounted to rotate about a fixed axis while the upper roll is mounted to float vertically relative to the lower roll and against a hold down means. Such hold down means may be in the form of tension springs which place a downward biasing force on the upper roll. Conventionally, such rolls have a smooth, imperforate cylindrical periphery as close to being perfectly cylindrical as manufacturally feasible. Nevertheless, some out-of-roundness is bound to occur. The upper and lower rolls thus contact solidly at certain points as they rotate and have light contact relative to each other at other points. Since the rotation of the rolls is utilized to pull the hay rearwardly from a pick-up, any spacing between the rolls might render the rearward feeding less efficient. To insure against this, it has been practiced heretofore to mount the rolls with their peripheries as close together as possible and to force them into close, abutting relationship. This causes considerable noise and vibration which is undesirable. Further, because of the close engagement of the rolls they wear out more rapidly. If the rolls are spaced somewhat, noise, vibration and wear are reduced, and the load on the driving means for the rolls is less when no material is passing between the rolls. However, feed problems may result when material is passing between the rolls.

One object of this invention is to provide large diameter crusher rolls of the cylindrical, imperforate type having peripheral means which assists, augments and renders materially more aggressive the feeding action of the rolls.

Another object of this invention is to provide crusher rolls having feeding means thereon which in no way interferes with the crushing characteristics of the rolls or with the operation of associated mechanism such as roll scrapers.

Another object of this invention is to provide co-extensive cylindrical crusher rolls which may be mounted with a clearance between their peripheries but which have a feeding efficiency superior to conventional rolls mounted in close, abutting relationship.

A further object of this invention is to provide an upper crusher roll which feeds crop material rearwardly as it is rotated and has a tendency to feed longitudinally toward one end of the roll, the lower crusher roll also feeding crop material rearwardly and having a tendency to feed longitudinally toward one end of the roll, said rolls being so mounted and driven that each roll offsets and equalizes the tendency of the other roll to feed longitudinally while neither roll affects the rearward feeding of its associated roll.

A still further object of this invention is to provide in a hay crusher, rolls possessing the above characteristics but which can be manufactured and installed at relatively low cost.

Other objects of this invention will be apparent hereinafter from the specification and from the recital in the appended claims.

In the drawings:

FIG. 3 is a generally diagrammatic sectional view of the crusher rolls of this invention and illustrating how the rolls are somewhat out-of-round, how they are mounted in peripherally spaced relationship, and how the welds on the rolls may project beyond the peripheries of the rolls or be somewhat depressed relative thereto;

FIG. 4 is a fragmentary sectional diagrammatic view illustrating a situation where the weld on each roll projects beyond the periphery of the roll;

FIG. 5 is a view similar to FIG. 4 illustrating a situation where the surface of the weld on each roll is depressed relative to the periphery of the roll; and FIG. 6 illustrates diagrammatically, in a series of view, the functional advantage and operation of the rolls of this invention.

Figure 1:
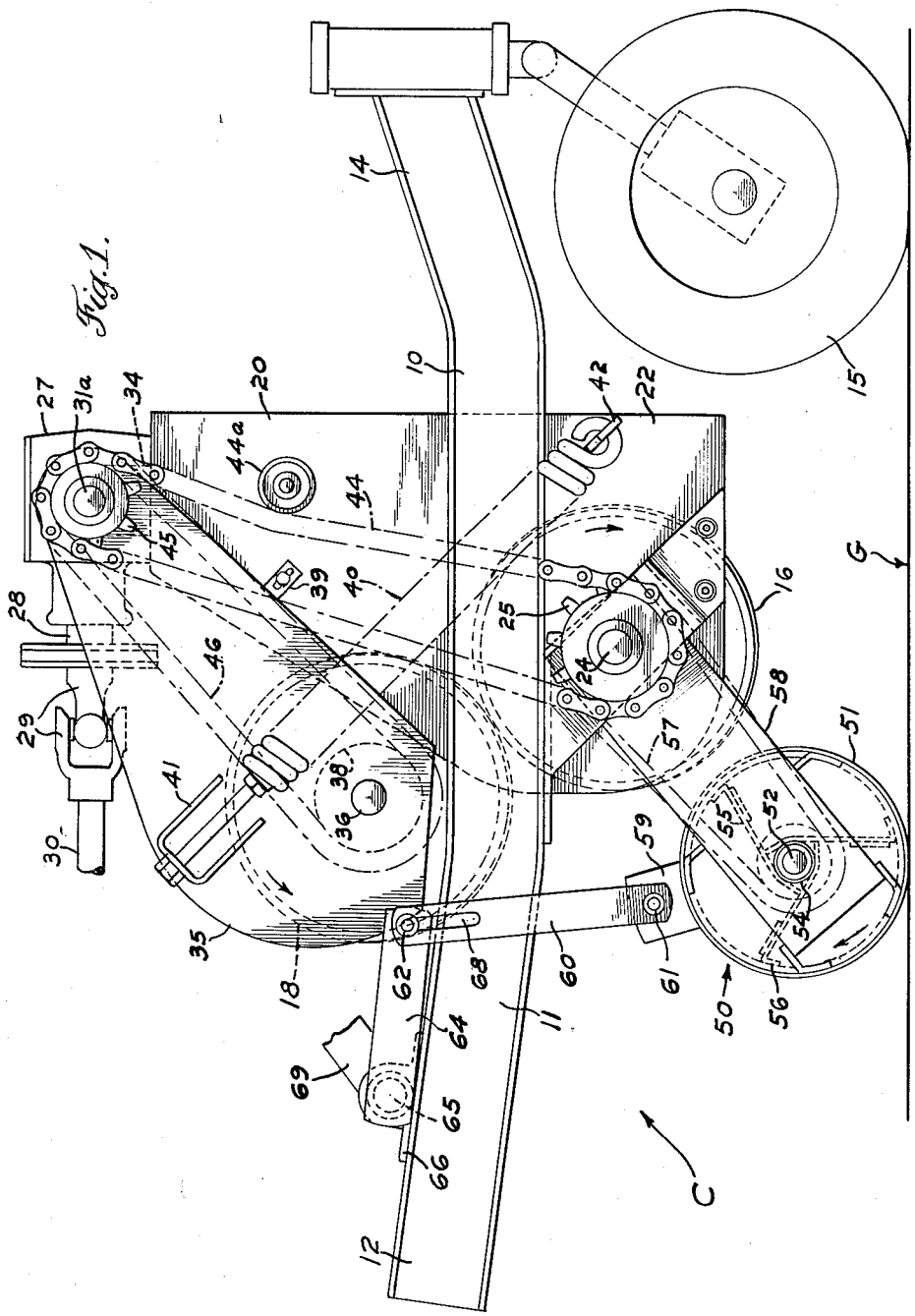
FIG. 1 is a side elevation of a hay crusher having crusher rolls mounted, operative and constructed according to this invention.
Figure 2:
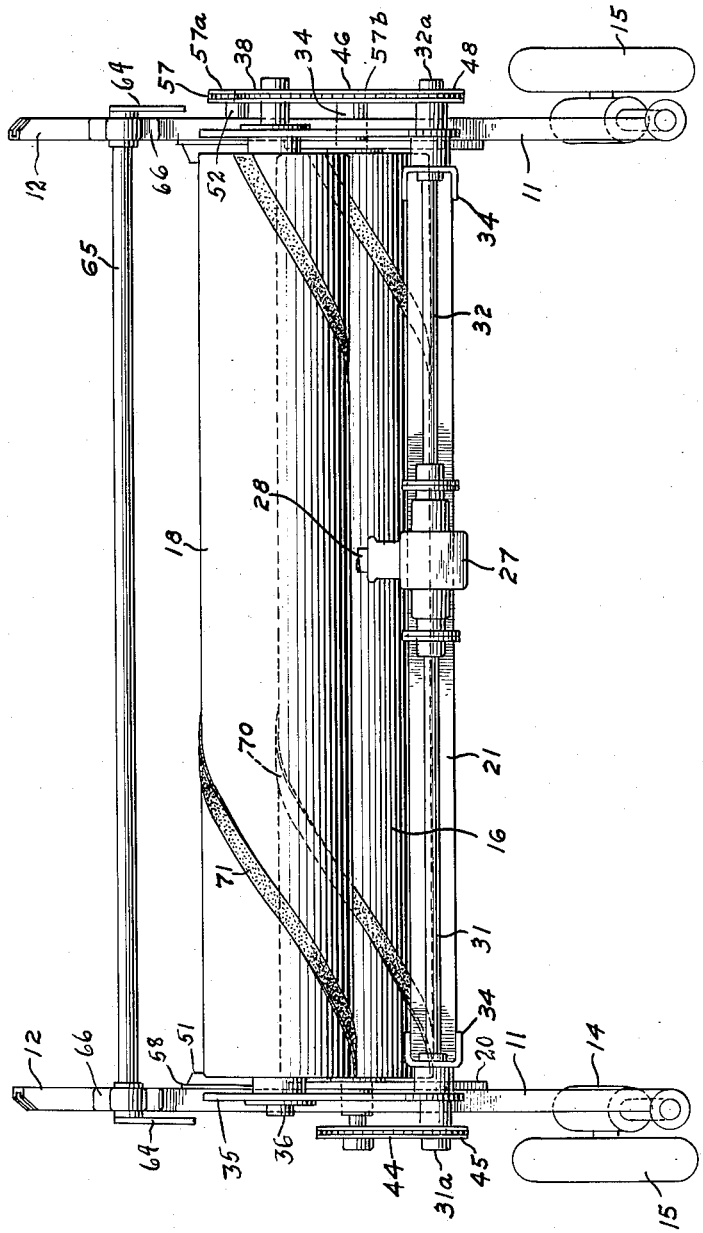
FIG. 2 is a plan view, on a reduced scale, of the hay crusher shown in FIG. 1.

Referring now to the drawings by numerals of reference and particularly to FIGS. 1 and 2, C denotes generally the crusher. It comprises a support frame 10 including a pair of spaced parallel longitudinally extending frame members 11—11 each of which has a forward end 12 and a rear end 14. The front ends 12 of the frame members are connectable through suitable means, not shown, to a tractor operable to move the crusher across a field of cut crop material. The rear ends of member 11—11 are supported on caster wheels 15.

Carried on frame 10 and extending between frame members 11—11 are cooperative, parallel, horizontal crusher rolls, namely, lower roll 16 and upper roll 18. Lower roll 16 is supported for rotation on a fixed axis in a pair of spaced vertical plates 20 connected to frame members 11. The plates 20 are connected adjacent their upper ends by a cross member 21 (FIG. 2). As shown in FIG. 1, the plates 20 have portions 22 which project downwardly below the support frame 10. The respective ends of lower roll 16 have stub shafts 24 journalled in these lower portions of the plates. The stub shaft 24 at the left end of the lower roll, when viewed as shown in FIG. 2, has a sprocket 25 keyed to it. Sprocket 25 serves for the imput of power to rotate the lower roll as will be subsequently described.

Supported medially on cross member 21 is a gearbox 27 which has an input shaft 28 connectable through universal coupling 29 to power-take-off shaft 30 driven from the tractor, not shown. Projecting from opposite sides of the gear box are output shafts 31 and 32 supported at their respective outer ends in pedestal-bearing mountings 34.

Each mounting 34 pivotally supports a plate 35 in which one end of upper roll 18 is rotatably mounted. The upper roll has stub shafts 36 at each end which are journalled in the plates 35. The stub shaft 36 at the right end of upper roll 18, when viewed as shown in FIG. 2, carries a sprocket 38 keyed to it for receiving power for rotating the upper roll. Upper roll 18 and plates 35 are swingable about the axes of shafts 31 and 32, and relative to the crusher frame whereby the upper roll 18 may move upwardly from the lower roll 16. Adjustable abutments 39 are provided on frame plates 20 which are engageable by the rear, side edges of plates 35. Abutments 39 limit the downward pivoting movement of upper roll 18 and stop the upper roll in a normal position of operation wherein the upper roll lightly touches the lower roll 16. Pivotal movement of upper roll 18 upwardly is resisted by gravity and by biasing springs 40 which urge the upper roll downwardly. The upper end of each spring 40 is connected to a bracket 41 welded to plate 35 and at its lower end to a hook 42 welded to the lower end 22 of plate 20.

Lower roll 16 is driven from shaft 31 through an endless chain 44. The endless chain is trained around sprocket 25 on stub shaft 24 at one end of the lower roll 16 and around a sprocket 45 keyed to an end 31a of shaft 31 projecting beyond its adjacent pedestal-bearing mounting 34. Upper roll 18 is driven by endless chain 46 trained around sprocket 38 on stub shaft 36 of the upper roll and around a sprocket 48 keyed on an end 32a of output shaft 32 extending beyond the adjacent pedestal bearing 34. Endless chain 44 is at one side of the crusher and endless chain 46 at the opposite side thereof. A conventional adjustable chain tightener 44a is provided for chain 44.

The drive from the gear box 27 is such that lower roll 16 rotates clockwise when viewed as shown in FIG. 1 and the upper roll 18 rotates counterclockwise. Assuming that the crusher is moved toward the left of FIG. 1 when in operation it will be seen that material delivered between the crusher rolls will be deposited rearwardly toward and between the ground wheels 15.

For the purpose of delivering crop material to the crusher rolls there is provided a pick-up 50 which extends parallel to the crusher rolls. Pick-up 50 comprises a pair of spaced discs 51 connected by a cross shaft 52 which is journalled at its ends in the respective discs. Shaft 52 is surrounded by a fixed sleeve 54 to which three angularly spaced transverse slat members 55 are affixed. Each slat member 55 has an outer edge 56 engageable with crop material on the ground G when the reel is rotated. The reel is adapted to be rotated by endless chain 57 in the direction indicated by the arrow in FIG. 1, that is, clockwise. Chain 57 is trained around a sprocket 57a on the right hand end (FIG. 2) of shaft 52, and around a sprocket 57b on the stub shaft 24 of roll 16 at that side of the crusher. The members 55 engage the crop material and throw it upwardly and rearwardly toward the crusher rolls. The rapidly rotating crusher rolls engage the picked up material and pull it rearwardly thereby cooperating with the pick-up. Centrifugal force is utilized by the pick-up in throwing the crop material towards the crusher rolls.

Pick-up 50 is supported on side plates 58—58. Each side plate is connected to a stub shaft 24 at one end of the lower roll 16 for pivotal movement thereabout. The opposite end of each plate provides a journal for an end of shaft 52. Each disc 51 has an upwardly projecting ear 59 welded to it to which a link 60 is pivotally connected at 61. The link 60 extends upwardly past frame member 11 and is pivotally connected at 62 to a lever arm 64 pivotal about the axis of a cross-shaft 65. Shaft 65 is supported at its respective ends in journal blocks 66 carried on frame members 11—11. Link 60 has a slot 68 to provide a lost motion connection at 62. As the crusher moves across the field, the pick-up is free to float vertically relative to ground variations without moving lever arm 64 upwardly, the pick-up as it is floating, pivoting about the axis of lower roll 16.

The pick-up 50 is elevated by means of a crank arm 69 welded to cross-shaft 65 and fragmentarily shown in FIG. 1. The crank arm is connected by a means not shown for movement by the operator of the tractor. For example, the crank arm may be pivoted by means of a rope which the operator can pull, the crank arm 69 moving counterclockwise when pivoted as viewed in FIG. 1. When the crank arm is shifted counterclockwise, cross shaft 65 correspondingly rotates and lever 64 is pivoted upwardly thereby lifting link 60 and the pick-up 50. Pivoting of crank arm 69 in the opposite direction permits the pick-up to drop.

The above structure plays no part in the present invention other than to provide the environment in which applicant's invention resides, namely, in the construction of the crusher rolls and the manner in which they are mounted and operated.

There are many ways in which the crusher rolls could be manufactured, such rolls being about eighty inches long and one foot in diameter. For example, the rolls could be cast and then machined to desired diameter. This is the conventional method of manufacturing crusher rolls. Also, a roll could be made of rolled plate linearly welded parallel to the longitudinal axis of the roll. Further, seamess tubing could be employed.

Applicant has set aside such roll constructions and has adapted spiral weld tubing for the crusher rolls. In the drawings, the spiral weld on lower roll 16 is designated 70 and the spiral weld on upper roll 18 is denoted 71.

In the construction illustrated, the spiral on each roll extends one and one quarter times around the roll. The width of the weld is about three quarters of one inch. When the rolls are manufactured there is a weld bead which projects beyond the periphery of the roll about one-fourth of an inch. In cross-section, the projecting portion of the weld is arcuate along its outside surface. Each roll employed in applicant's crusher has this weld cut down, the specific means for achieving such cutting being immaterial. However, the condition of the weld after it has been cut is very important to the objects of this invention.

When the rolls are formed and welded, the diameter of the rolls will be close to one foot. Whether the rolls are plus or minus about one-eighth of an inch makes no difference so long as both rolls in a given crusher are close to the same diameter, such as both twelve and one-eighth, or both eleven and seven-eighths, or both exactly twelve inches. This allowed variation makes for ease of manufacture. The weld bead is cut off the rolls to bring the weld flush with the periphery of the roll. This is usually done by a cutting tool which moves longitudinally relative to the axis of the roll as it cuts the weld bead, the roll being rotatably indexed in time with the cutter so that the cutter follows the weld along the roll. The cutter is operated without regard for variations in the diameter of the roll. A certain out-of-roundness or eccentricity in the roll is not taken into consideration. As a result, when the weld bead is cut off there will be variations in the depth of the cut. Some places the weld will be cut off above the periphery of the roll and at some places below the periphery thereof. A variation of plus or minus 1/32 of an inch in either direction is permissible or a total variation of one-sixteenth of an inch.

Thus, a given weld along a roll may project 1/32 of an inch in some areas as illustrated in FIG. 4 or its surface may be depressed 1/32 of an inch in other areas as illustrated in FIG. 5, and in still other areas be close to flush with the roll periphery.

This weld as it extends from one end of the roll to the other and around the roll, forms a rough, uneven, definite spiral path. Such path exerts a noticeable effect on the material being crushed by the roll when the roll is mounted in the crusher and the crusher operated. Specifically, such weld exerts a feeding effect on the material.

Referring to FIG. 6, and to the upper roll 18 in each of the sequential views shown, we see that the path of weld 71 tends to urge material towards one axial end of the roll as indicated by the arrows A and also in the direction of rotation of the roll as indicated by the arrows B. The feeding force in direction B is highly desirable. That is because such force is tending to move the material through the rolls and aids in the discharge of such material. However, the feeding of material in direction A is not desirable because it tends to jam up the material at one end of the roll.

Also in FIG. 6, the weld 70 on lower roll 16 exerts a longitudinal feeding force as indicated by the arrows C and a feeding action in the direction of rotation of the roll indicated by arrows D. As with the upper roll, the longitudinal feeding force is undesirable. However, the force which urges the material in the direction of rotation of the roll is desirable.

To eliminate the undesirable feeding forces, namely, forces A and C without disturbing the desirable forces in directions B and D, applicant mounts the upper and lower rolls so that they are co-extensive, that is, the spiral paths or welds on both rolls extend in the same direction. Since the rolls rotate oppositely, the upper roll feeds longitudinally in one direction and the lower roll feeds longitudinally in the opposite direction. Thus, the tendency of the rolls to feed longitudinally is equalized. Stated otherwise, the tendency of roll 18 to feed in direction A is offset by the tendency of roll 16 to feed in direction C. Thus, longitudinal feeding is eliminated while the forces which feed in the direction of rotation of the rolls, namely directions B and D, are maintained.

Because of the feeding forces in directions B and D, it is possible to mount roll 16 and 18 in a manner which has been heretofore impossible. That is, the rolls may be mounted not as close together as was previouly required. Preferably, the rolls are mounted so that they lightly touch or have a small clearance, at their respective high points. The out-of-roundness or eccentricity in manufacture of upper roll 18 is indicated by line 18a in FIG. 3 and the eccentricity or out-of-roundness of the lower roll by line 16a. It will be seen from FIG. 3 that at some points the rolls will touch or almost touch and at other points will be spaced when they rotate. This spacing may be zero, one thirty-second, one sixteenth, one eighth and sometimes even slightly greater. However, the feeding of the rolls is not impaired because forces B and D take up the feeding slack created.

Without the spiral paths on each roll the upper roll would have to be pressed tightly against the lower roll to maintain proper operation. As previously stated this would result in increased noise and rapid wear on the rolls, and increase the loads on the drive means. Still further, the rolls would have to be made to closer specifications, the tolerances permitted with applicant's structure and arrangement being completely unsuitable. In a conventional crusher, if there was a spacing of an eighth of an inch or more between cooperative crusher rolls, the efficiency of the rolls in moving material between themselves would be greatly impaired. However, no such impairment results with applicant's invention.

Because of the tolerances permitted, applicant's crusher rolls can be constructed at low cost thereby rendering the over-all cost of the crusher, to the farmer, low.

While this invention has been described in connection with a particular embodiment thereof, it will be understood that it is capable of further modification and other uses. For example, a machined and cast roll could be provided and then formed with a spiral path in it to give the desired action. This application is intended to cover any variations, uses or adaptations of the invention following, in general, the principles of the invention and including such departures from the present disclosure as come within known or customary practice in the art to which the invention pertains, and as fall within the scope of the invention of the limits of the appended claims.

Having thus described my invention what I claim is:

1. In a crop material crusher, a pair of cooperative, rotatable, generally cylindrical crusher rolls, each of said rolls comprising a length of spiral welded tubing the weld of which provides a path from one axial end of the roll to the other which is uneven relative to the cylindrical periphery of the remainder of the roll, a support frame, means mounting said rolls on said support frame with their respective spirals extending in the same direction, and means for rotating said rolls in opposite directions.

2. In a crop material crusher, a pair of cooperative, rotatable, generally cylindrical, crusher rolls, each of which comprises a length of spiral welded tubing the weld bead of which has been cut down to provide a relatively flat spiral path relative to the cylindrical periphery of the remainder of the roll, said spiral path extending around each roll from one axial end to the other, a support frame, means mounting said rolls on said support frame with their respective spirals extending in the same direction, and means for rotating said rolls in opposite directions.

3. In a crop material crusher, a pair of cylindrical crusher rolls of similar design and having imperforate peripheries, the periphery of each of said rolls being divided into a plurality of surfaces, each of said surfaces extending along and around the axis of its respective roll in the form of a spiral path having an angular extent at least from one diametrical side of the roll to another, a first of said plurality of surfaces of each roll providing a relatively smooth, wide spiral path concentric with the roll axis, a second of said plurality of surfaces providing a spiral path substantially narrower in width than said first surface and having portions, at least, depressed relative to the first surface, a support frame, means mounting said rolls on said support frame with their axes parallel, said first surfaces in crop crushing relation, and said spiral paths extending in the same direction, and means for rotating said rolls in opposite directions, whereby a tendency of one roll to move crop material passed between the rolls in one axial direction is offset by a corresponding tendency of the other roll to move material in the opposite axial direction.

References Cited in the file of this patent

UNITED STATES PATENTS

| | | |
|---|---|---|
| 251,660 | Wallace et al. | Dec. 27, 1881 |
| 278,273 | Rickerson | May 22, 1883 |
| 1,722,999 | Andrews et al. | Aug. 6, 1929 |
| 2,239,458 | Hetzel | Apr. 22, 1941 |
| 2,345,715 | Reed | Apr. 4, 1944 |
| 2,416,123 | Siemen | Feb. 18, 1947 |
| 2,712,282 | Koch | July 5, 1955 |
| 2,731,782 | Mason | Jan. 24, 1956 |
| 2,829,587 | Russell | Apr. 8, 1958 |

FOREIGN PATENTS

| | | |
|---|---|---|
| 570,116 | France | Jan. 12, 1924 |
| 813,840 | Germany | Sept. 17, 1951 |